United States Patent
Lee et al.

(10) Patent No.: US 12,227,645 B2
(45) Date of Patent: Feb. 18, 2025

(54) POLYAMIDE RESIN COMPOSITION AND MOLDED PRODUCT COMPRISING SAME

(71) Applicant: LOTTE CHEMICAL CORPORATION, Seoul (KR)

(72) Inventors: Sang Hwa Lee, Uiwang-si (KR); Ho Geun Park, Uiwang-si (KR); Yeong Deuk Seo, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 649 days.

(21) Appl. No.: 17/598,447

(22) PCT Filed: Mar. 25, 2020

(86) PCT No.: PCT/KR2020/004062
§ 371 (c)(1),
(2) Date: Sep. 27, 2021

(87) PCT Pub. No.: WO2020/197261
PCT Pub. Date: Oct. 1, 2020

(65) Prior Publication Data
US 2022/0186026 A1    Jun. 16, 2022

(30) Foreign Application Priority Data

Mar. 28, 2019  (KR) .................. 10-2019-0035581
Jan. 10, 2020  (KR) .................. 10-2020-0003444

(51) Int. Cl.
*C08L 77/06*     (2006.01)

(52) U.S. Cl.
CPC ........... *C08L 77/06* (2013.01); *C08L 2203/20* (2013.01)

(58) Field of Classification Search
CPC ............ C08L 77/06; C08L 71/02; C08K 7/14
See application file for complete search history.

(56) References Cited

U.S. PATENT DOCUMENTS

2003/0023008 A1   1/2003  Uchida et al.
2012/0157606 A1   6/2012  Lee et al.
(Continued)

FOREIGN PATENT DOCUMENTS

CN    1390887 A    1/2003
CN    108779328 A  11/2018
(Continued)

OTHER PUBLICATIONS

Supplementary European Search Report in counterpart European Application No. 20778843.1 dated Nov. 29, 2022, pp. 1-3.
(Continued)

*Primary Examiner* — Ling Siu Choi
*Assistant Examiner* — Olga Lucia Donahue
(74) *Attorney, Agent, or Firm* — Additon, Pendleton & Witherspoon, P.A.

(57) ABSTRACT

A polyamide resin composition of the present invention comprises: approximately 100 parts by weight of a polyamide resin comprising approximately 5 to 40 weight % of an aromatic polyamide resin and approximately 60 to 95 weight % of an aliphatic polyamide resin; approximately 30 to 70 parts by weight of an inorganic filler; and approximately 0.5 to 5 parts by weight of modified polyalkylene glycol. The modified polyalkylene glycol comprises an isocyanate group, a succinimide group or an epoxy group at one terminal of polyalkylene glycol. The polyamide resin composition exhibits excellent adhesiveness with other materials, excellent antifouling properties, impact resistance, stiffness, injection moldability and the like.

20 Claims, 1 Drawing Sheet

(56) References Cited

U.S. PATENT DOCUMENTS

| | | | |
|---|---|---|---|
| 2013/0030124 A1* | 1/2013 | Tomoi | C08L 77/06 152/450 |
| 2014/0179850 A1 | 6/2014 | Aepli et al. | |
| 2017/0029621 A1 | 2/2017 | Kim et al. | |
| 2018/0147761 A1* | 5/2018 | Chen | B29C 45/14311 |
| 2019/0077957 A1 | 3/2019 | Yamada et al. | |

FOREIGN PATENT DOCUMENTS

| | | |
|---|---|---|
| JP | 02-173063 A | 7/1990 |
| JP | 07-166106 A | 6/1995 |
| JP | 2018-003002 A | 1/2018 |
| KR | 10-2012-0089912 A | 8/2012 |
| KR | 10-2014-0129487 A | 11/2014 |
| KR | 10-2017-0015023 A | 2/2017 |
| WO | 2020/197261 A1 | 10/2020 |

OTHER PUBLICATIONS

Office Action in counterpart Chinese Application No. 202080024589.2 dated Feb. 3, 2023, pp. 1-6.
International Search Report in counterpart International Application No. PCT/KR2020/004062 dated Jul. 8, 2020, pp. 1-6.

* cited by examiner

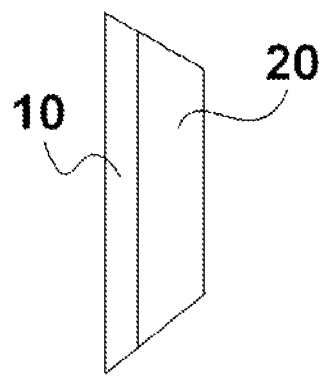

POLYAMIDE RESIN COMPOSITION AND MOLDED PRODUCT COMPRISING SAME

CROSS-REFERENCE TO RELATED APPLICATIONS

This application claims priority to and the benefit of International Application No. PCT/KR2020/004062, filed Mar. 25, 2020, which published as WO 2020/197261 on Oct. 1, 2020, Korean Patent Application No. 10-2019-0035581, filed in the Korean Intellectual Property Office on Mar. 28, 2019, and Korean Patent Application No. 10-2020-0003444, filed in the Korean Intellectual Property Office on Jan. 10, 2020, the entire disclosure of each of which is incorporated herein by reference.

TECHNICAL FIELD

The present invention relates to a polyamide resin composition and a molded article including the same. More particularly, the present invention relates to a polyamide resin composition that has good properties in terms of bonding strength to other materials, antifouling properties, impact resistance, stiffness, injection moldability, and the like, and a molded product including the same.

BACKGROUND ART

A polyamide resin is used in various fields including interior/exterior materials for electric/electronic products, components for automobiles, and the like due to good properties thereof in terms of heat resistance, wear resistance, chemical resistance, flame retardancy, and the like. In particular, the polyamide resin is broadly used for exterior materials for portable devices, such as mobile phones, portable computers, and the like.

When used as an exterior material, the polyamide resin can be spotted or contaminated upon contact with certain contaminants. Although there is a method of painting or coating a product to prevent contamination of the product, painting or coating can increase processing costs and cause various defects.

In addition, since a polyamide resin product exhibiting good bonding strength to other materials is applicable to various products including an exterior material for portable devices, there is demand for study for improvement in bonding strength of the polyamide resin to other materials.

Therefore, there is a need for development of a polyamide resin composition that can reduce contamination due to various contaminants in daily life and can easily secure bonding strength to other materials using general adhesives when produced into a product.

The background technique of the present invention is disclosed in US Publication No. 2014/0179850 and the like.

DISCLOSURE

Technical Problem

It is one aspect of the present invention to provide a polyamide resin composition that has good properties in terms of bonding strength to other materials, antifouling properties, impact resistance, stiffness, injection moldability, and the like.

It is another aspect of the present invention to provide a molded product formed of the polyamide resin composition.

The above and other aspects of the present invention will become apparent from the detailed description of the following embodiments.

Technical Solution

1. One aspect of the present invention relates to a polyamide resin composition. The polyamide resin composition includes: about 100 parts by weight of a polyamide resin including about 5% by weight (wt %) to about 40 wt % of an aromatic polyamide resin and about 60 wt % to about 95 wt % of an aliphatic polyamide resin; about 30 to about 70 parts by weight of inorganic fillers; and about 0.5 to about 5 parts by weight of a modified polyalkylene glycol, the modified polyalkylene glycol having an isocyanate group, a succinimide group or an epoxy group at one terminal of polyalkylene glycol.

2. In embodiment 1, the aromatic polyamide resin may include at least one of a polymer of an aromatic dicarboxylic acid and an aliphatic diamine and a polymer of an aliphatic dicarboxylic acid and an aromatic diamine.

3. In embodiment 1 or 2, the aromatic polyamide resin may be a polymer of an aliphatic dicarboxylic acid and an aromatic diamine.

4. In embodiments 1 to 3, the aliphatic polyamide resin may include at least one of polyamide 6, polyamide 11, polyamide 12, polyamide 4,6, polyamide 6,6, polyamide 6,10, polyamide 6,12, polyamide 10,10, and polyamide 10,12.

5. In embodiments 1 to 4, the inorganic fillers may include at least one of glass fibers, talc, wollastonite, whisker, silica, mica, and basalt fibers.

6. In embodiments 1 to 5, the modified polyalkylene glycol may have a weight average molecular weight of about 500 g/mol to about 10,000 g/mol, as measured by gel permeation chromatography (GPC).

7. In embodiments 1 to 6, a weight ratio of the aromatic polyamide resin to the aliphatic polyamide resin may be in the range of about 1:2 to about 1:15.

8. In embodiments 1 to 7, a weight ratio of the polyamide resin to the modified polyalkylene glycol may be in the range of about 30:1 to about 40:1.

9. In embodiments 1 to 8, the polyamide resin composition may have a bonding strength (shear stress) of about 800 kgf/cm$^2$ to about 1,100 kgf/cm$^2$, as measured on an injection-molded specimen having a size of 100 mm×25 mm×2 mm in accordance with ASTM D1002, in which the specimen is bonded to a glass specimen having the same size as the specimen via a urethane-based bonding agent subjected to aging at 110° C. so as to have an overlapping area of 30 mm×25 mm therebetween and is heated at a bonded portion therebetween at 80° C. for 120 seconds, followed by aging at room temperature for 5 minutes.

10. In embodiments 1 to 9, the polyamide resin composition may have a bonding strength (shear stress) of about 800 kgf/cm$^2$ to about 1,300 kgf/cm$^2$, as measured on an injection-molded specimen having a size of 100 mm×25 mm×2 mm in accordance with ASTM D1002, in which the specimen is bonded to a polycarbonate specimen having the same size as the specimen via a urethane-based bonding agent subjected to aging at 110° C. so as to have an overlapping area of 30 mm×25 mm therebetween and is heated at a bonded portion therebetween at 80° C. for 120 seconds, followed by aging at room temperature for 5 minutes.

11. In embodiments 1 to 10, the polyamide resin composition may have a brightness recovery rate of 90% or more, as calculated according to Equation 1:

$$\text{Brightness recovery rate (\%)} = L_1/L_0 \times 100 \quad \text{Equation 1}$$

where $L_0$ denotes an initial L* value of an injection-molded specimen having a size of 50 mm×90 mm×2 mm, as measured using a colorimeter, and $L_1$ denotes an L* value of the injection-molded specimen, as measured using the colorimeter after three lines (distance between adjacent lines: 3 mm) are drawn on a surface of the specimen under a load of 200 g using a black permanent pen (Manufacturer: Monami Co., Ltd., Product Name: Namepen F) and the specimen is left under conditions of 50° C. and at 95% RH (relative humidity) for 1 hour and then under conditions of 25° C. and at 50% RH for 1 hour, followed by cleaning a surface of the specimen 5 times with ethanol and a cloth.

12. In embodiments 1 to 11, the polyamide resin composition may have a flexural modulus of about 40,000 kgf/cm$^2$ to about 70,000 kgf/cm$^2$, as measured on a 6.4 mm thick specimen at a speed of 2.8 mm/min in accordance with ASTM D790, a notched Izod impact strength of about 10 kgf·cm/cm to about 30 kgf·cm/cm, as measured on a ⅛″ thick specimen in accordance with ASTM D256, and a resistance of about 150 N to about 200 N generated from an eject pin at the dead center of a circular specimen (diameter: 100 mm, thickness: 2 mm) upon injection molding.

13. Another aspect of the present invention relates to a molded product. The molded product is formed of the polyamide resin composition according to any one of embodiments 1 to 12.

14. In embodiment 13, the molded product may be a plastic member of an electronic device housing including a glass frame and a plastic member adjoining at least one surface of the glass frame.

15. In embodiment 13, the molded product may be a plastic member of an electronic device housing including a polycarbonate resin frame and a plastic member adjoining at least one surface of the polycarbonate resin frame.

Advantageous Effects

The present invention provides a polyamide resin composition that has good properties in terms of bonding strength to other materials, antifouling properties (brightness recovery rate), and the like, and a molded product formed of the same.

DESCRIPTION OF DRAWINGS

FIG. 1 is a schematic sectional view of an electronic device housing according to one embodiment of the present invention.

BEST MODE

Hereinafter, embodiments of the present invention will be described in detail.

A polyamide resin composition according to the present invention includes: (A) an aromatic polyamide resin; (B) an aliphatic polyamide resin; (C) inorganic fillers; and (D) a modified polyalkylene glycol.

As used herein to represent a specific numerical range, the expression "a to b" means "≥a and ≤b".

(A) Aromatic Polyamide Resin

The aromatic polyamide resin according to the present invention serves to improve heat resistance, stiffness and impact resistance of the polyamide resin composition and may be selected from any aromatic polyamide resin used for typical polyamide resin compositions.

In one embodiment, the aromatic polyamide resin may include at least one of a polymer of an aromatic dicarboxylic acid and an aliphatic diamine; and a polymer of an aliphatic dicarboxylic acid and an aromatic diamine, which are prepared through reaction by a polymerization method well-known to those skilled in the art. For example, the polymer of the aliphatic dicarboxylic acid and the aromatic diamine may be used as the aromatic polyamide resin.

Herein, the "dicarboxylic acid" includes dicarboxylic acid, alkyl esters thereof ($C_1$ to $C_4$ lower alkyl esters, such as monomethyl ester, monoethyl ester, dimethyl ester, diethyl ester, dibutyl ester, and the like), acid anhydrides thereof, and the like, and forms a dicarboxylic acid-derived repeat unit (dicarboxylic acid moiety) through reaction with diamine and the like. In addition, the dicarboxylic acid-derived repeat unit and a diamine-derived repeat unit (diamine moiety) mean residues from which a hydrogen atom (removed from an amine group), a hydroxyl group, or an alkoxy group (removed from a carboxylic acid group) is removed upon polymerization of the dicarboxylic acid and the diamine.

In one embodiment, the aromatic dicarboxylic acid may be a compound including at least one kind of $C_8$ to $C_{20}$ aromatic dicarboxylic acid and may include at least one of, for example, terephthalic acid, isophthalic acid, 2,6-naphthalenedicarboxylic acid, 2,7-naphthalenedicarboxylic acid, 1,4-naphthalenedicarboxylic acid, 1,4-phenylenedioxyphenylene acid, 1,3-phenylenedioxydiacetic acid, diphenic acid, 4,4'-oxybis(benzoic acid), diphenylmethane-4,4'-dicarboxylic acid, diphenyl sulfone-4,4'dicarboxylic acid, 4,4'-diphenylcarboxylic acid, and mixtures thereof. Specifically, the aromatic dicarboxylic acid may be terephthalic acid, isophthalic acid, or a mixture thereof.

In one embodiment, the aliphatic dicarboxylic acid may be a $C_6$ to $C_{20}$ linear, branched or cyclic aliphatic dicarboxylic acid, for example, adipic acid, sebacic acid, 1,4-cyclohexanedicarboxylic acid, 1,3-cyclohexanedicarboxylic acid, and the like. Specifically, the aliphatic dicarboxylic acid may be adipic acid, sebacic acid, and the like.

In one embodiment, the aromatic diamine may include at least one kind of $C_6$ to $C_{30}$ aromatic diamine. For example, the aromatic diamine may be selected from among phenylene diamine compounds, such as m-phenylene diamine, p-phenylene diamine, and the like, xylene diamine compounds, such as m-xylene diamine, p-xylene diamine, and the like, and naphthalene diamine compounds.

In one embodiment, the aliphatic diamine may include at least one kind of $C_4$ to $C_{20}$ aliphatic diamine. For example, the aliphatic diamine may be selected from among linear or branched aliphatic diamines, such as 1,4-butanediamine, 1,6-hexanediamine (hexamethylene diamine: HMDA), 1,7-heptanediamine, 1,8-octanediamine, 1,10-decanediamine (DDA), 1,12-dodecanediamine (DDDA), 3-methyl-1,5-pentanediamine, 2,2,4-trimethyl-1,6-hexanediamine, 2,4,4-trimethyl-1,6-hexanediamine, 5-methyl-1,9-nonanediamine, 2,2-oxybis(ethylamine), bis(3-aminopropyl)ether, ethylene glycol bis(3-aminopropyl)ether (EGBA), 1,7-diamino-3,5-dioxoheptane, and mixtures thereof.

In one embodiment, the aromatic polyamide resin may include the dicarboxylic acid-derived repeat unit (A) and the diamine-derived repeat unit (B) in a mole ratio (diamine(B)/dicarboxylic acid(A)) of about 0.95 to about 1.15, for example, about 1.00 to about 1.10. Within this range, the aromatic polyamide resin enables preparation of a polyamide resin having a suitable degree of polymerization for molding and can prevent deterioration in properties due to unreacted monomer.

In one embodiment, the aromatic polyamide resin may have a glass transition temperature of about 100° C. to about 150° C., for example, about 120° C. to about 140° C., as measured by differential scanning calorimeter (DSC). Within this range, the polyamide resin composition can exhibit good properties in terms of heat resistance, stiffness, impact resistance, and the like.

In addition, the aromatic polyamide resin may have an intrinsic viscosity [η] of about 0.7 dL/g to about 1.2 dL/g, for example, about 0.8 dL/g to about 1.0 dL/g, as measured using an Ubbelohde viscometer at 25° C. after dissolving the aromatic polyamide resin in a strong (98%) sulfuric acid solution to a concentration of 0.5 g/dL. Within this range, the polyamide resin composition can exhibit good properties in terms of heat resistance, stiffness, impact resistance, and the like.

In one embodiment, the aromatic polyamide resin may be present in an amount of about 5 wt % to about 40 wt %, for example, about 10 wt % to about 35 wt %, based on 100 wt % of the polyamide resin (the aromatic polyamide resin and the aliphatic polyamide resin). If the content of the aromatic polyamide resin is less than about 5 wt %, the polyamide resin composition can have poor properties in terms of bonding strength to other materials (glass, polycarbonate resin, and the like), antifouling properties, external appearance, mechanical properties, and the like, whereas, if the content of the aromatic polyamide resin exceeds about 40 wt %, the polyamide resin composition can have poor properties in terms of bonding strength to other materials, brightness recovery rate, processability (injection moldability), and the like.

(B) Aliphatic Polyamide Resin

The aliphatic polyamide resin according to the embodiment of the present invention serves to improve impact resistance and processability of the polyamide resin composition together with the aromatic polyamide resin and may be selected from typical aliphatic polyamide resins.

In one embodiment, the aliphatic polyamide resin may include polyamide 6, polyamide 11, polyamide 12, polyamide 46, polyamide 66, polyamide 6,10, polyamide 6,12, polyamide 10,10, polyamide 10,12, and combinations thereof.

In one embodiment, the aliphatic polyamide resin may have a relative viscosity [$\eta_{rel}$] of 2 to 3, for example, 2.3 to 2.8, as measured using an Ubbelohde viscometer at 25° C. after dissolving the aliphatic polyamide resin in a strong (96%) sulfuric acid solution to a concentration of 0.5 g/dL. Within this range, the polyamide resin composition can exhibit good processability and impact resistance.

In one embodiment, the aliphatic polyamide resin may be present in an amount of about 60 wt % to about 95 wt %, for example, about 65 wt % to about 90 wt %, based on 100 wt % of the polyamide resin (the aromatic polyamide resin and the aliphatic polyamide resin). If the content of the aliphatic polyamide resin is less than about 60 wt %, the polyamide resin composition can have poor properties in terms of processability, antifouling properties, bonding strength to other materials, and the like, whereas, if the content of the aliphatic polyamide resin exceeds about 95 wt %, the polyamide resin composition can have poor properties in terms of appearance, antifouling properties, and the like.

In one embodiment, a weight ratio of the aromatic polyamide resin to the aliphatic polyamide resin may be in the range of about 1:2 to about 1:15, for example, about 1:3 to about 1:10. Within this range, the polyamide resin composition can exhibit better properties in terms of appearance, antifouling properties, processability, and the like.

(C) Inorganic Fillers

The inorganic fillers according to the embodiment of the invention serve to improve mechanical properties including stiffness and the like of the polyamide resin composition and may be selected from among inorganic fillers used for typical polyamide resin compositions.

In one embodiment, the inorganic fillers may include glass fibers, talc, wollastonite, whisker, silica, mica, and basalt fibers, and combinations thereof. Specifically, the inorganic fillers may be glass fibers.

In one embodiment, the inorganic fillers may be glass fibers having a circular cross-section having an average diameter of about 5 μm to about 20 μm and a pre-processing length of about 2 mm to about 5 mm, as measured by an optical microscope, or glass fibers having a planar or elliptical cross-section having an aspect ratio (major diameter/minor diameter of the cross-section) of about 1.5 to about 10 and a pre-processing length of about 2 mm to about 5 mm. Within this range, the inorganic fillers can improve mechanical properties and surface hardness of the polyamide resin composition without deteriorating other properties of the polyamide resin composition, such as external appearance and the like.

In one embodiment, the glass fibers may have various shapes, such as fibrous, particulate, rod, needle, flake, and amorphous shapes, and various cross-sections, such as circular, elliptical, and rectangular cross-sections. For example, glass fibers having a fibrous shape having a circular and/or rectangular cross-section may be used in terms of mechanical properties.

In one embodiment, the inorganic fillers may be present in an amount of about 30 to about 70 parts by weight, for example, about 40 to about 60 parts by weight, relative to about 100 parts by weight of the polyamide resin. If the content of the inorganic fillers is less than about 30 parts by weight, the polyamide resin composition can suffer from deterioration in impact resistance, stiffness, processability, and the like, and if the content of the inorganic fillers exceeds about 70 parts by weight, the polyamide resin composition can suffer from deterioration in external appearance, antifouling properties, bonding strength to other materials processability, and the like.

(D) Modified Polyalkylene Glycol

According to the present invention, the modified polyalkylene glycol serves to improve bonding strength of the polyamide resin composition to other materials and antifouling properties and has an isocyanate group, a succinimide group or an epoxy group at one terminal of polyalkylene glycol.

In one embodiment, the polyalkylene glycol may be selected from among polyethylene glycol, polytetramethylene glycol, and combinations thereof.

In one embodiment, the modified polyalkylene glycol may have a weight average molecular weight of about 500 g/mol to about 10,000 g/mol, for example, about 1,000 g/mol to about 5,000 g/mol, as measured by gel permeation chromatography (GPC). Within this range, the polyamide resin composition can exhibit good bonding strength to other materials and antifouling properties.

In one embodiment, the modified polyalkylene glycol may be present in an amount of about 0.5 to about 5 parts by weight, for example, about 1 to about 4 parts by weight, relative to about 100 parts by weight of the polyamide resin. If the content of the modified polyalkylene glycol is less than about 0.5 parts by weight, the polyamide resin composition can suffer from deterioration in bonding strength to other materials, antifouling properties, and the like, and if the content of the modified polyalkylene glycol exceeds about 5 parts by weight, the polyamide resin composition can suffer from deterioration in external appearance, antifouling properties, processability, and the like.

In one embodiment, the polyamide resin (A+B) and the modified polyalkylene glycol (D) may be present in a weight ratio ((A+B):(D)) of about 30:1 to about 40:1, for example, about 32:1 to about 38:1. Within this range, the polyamide resin composition can exhibit better properties in terms of bonding strength to other materials, antifouling properties, mechanical properties, processability, external appearance, and balance therebetween.

The polyamide resin composition according to one embodiment of the present invention may further include additives used in typical polyamide resin compositions so long as the additives do not obstruct advantageous effects of the prevent invention. Examples of the additives may include a heat stabilizer, a flame retardant, an antioxidant, a lubricant, a release agent, a nucleating agent, a colorant, and mixtures thereof, without being limited thereto. The additives may be present in an amount of about 0.001 to about 40 parts by weight, for example, about 0.1 to about 20 parts by weight, relative to about 100 parts by weight of the polyamide resin (the aromatic polyamide resin and the aliphatic polyamide resin).

The polyamide resin composition according to one embodiment of the present invention may be prepared in pellet form by mixing the above components, followed by melt extrusion at about 270° C. to about 320° C., for example, about 280° C. to about 310° C., using a typical twin-screw extruder.

In one embodiment, the polyamide resin composition may have a bonding strength (shear stress) of about 800 kgf/cm$^2$ to about 1,100 kgf/cm$^2$, for example, about 900 kgf/cm$^2$ to about 1,000 kgf/cm$^2$, as measured on an injection-molded specimen having a size of 100 mm×25 mm×2 mm in accordance with ASTM D1002, in which the specimen is bonded to a glass specimen having the same size as the specimen via a urethane-based bonding agent subjected to aging at 110° C. so as to have an overlapping area of 30 mm×25 mm therebetween and is heated at a bonded portion therebetween at 80° C. for 120 seconds, followed by aging at room temperature for 5 minutes.

In one embodiment, the polyamide resin composition may have a bonding strength (shear stress) of about 800 kgf/cm$^2$ to about 1,300 kgf/cm$^2$, for example, about 900 kgf/cm$^2$ to about 1,200 kgf/cm$^2$, as measured on an injection-molded specimen having a size of 100 mm×25 mm×2 mm in accordance with ASTM D1002, in which the specimen is bonded to a polycarbonate specimen having the same size as the specimen via a urethane-based bonding agent subjected to aging at 110° C. so as to have an overlapping area of 30 mm×25 mm therebetween and is heated at a bonded portion therebetween at 80° C. for 120 seconds, followed by aging at room temperature for 5 minutes.

In one embodiment, the polyamide resin composition may have a brightness recovery rate of about 90% or more, for example, about 94% to about 99%, as calculated according to Equation 1.

$$\text{Brightness recovery rate (\%)} = L_1/L_0 \times 100, \quad \text{Equation 1}$$

where $L_0$ denotes an initial L* value of an injection-molded specimen having a size of 50 mm×90 mm×2 mm, as measured using a colorimeter, and $L_1$ denotes an L* value of the injection-molded specimen, as measured using the colorimeter after three lines (distance between adjacent lines: 3 mm) are drawn on a surface of the specimen under a load of 200 g using a black permanent pen (Manufacturer: Monami Co., Ltd., Product Name: Namepen F) and the specimen is left under conditions of 50° C. and at 95% RH (relative humidity) for 1 hour and then under conditions of 25° C. and at 50% RH for 1 hour, followed by cleaning the surface of the specimen 5 times with ethanol and a cloth.

In one embodiment, the polyamide resin composition may have a flexural modulus of about 40,000 kgf/cm$^2$ to about 70,000 kgf/cm$^2$, for example, about 55,000 kgf/cm$^2$ to about 70,000 kgf/cm$^2$, as measured on a 6.4 mm thick specimen at a speed of 2.8 mm/min in accordance with ASTM D790.

In one embodiment, the polyamide resin composition may have a notched Izod impact strength of about 10 kgf·cm/cm to about 30 kgf·cm/cm, for example, about 11 kgf·cm/cm to about 25 kgf·cm/cm, as measured on a ⅛" thick specimen in accordance with ASTM D256.

In one embodiment, the polyamide resin composition may have a resistance of about 150 N to about 200 N, for example, about 155 to about 195 N, generated from an ejector pin at the dead center of a circular specimen (diameter: 100 mm, thickness: 2 mm) upon injection molding, as measured using a pressure sensor.

A molded product according to the present invention is formed of the polyamide resin composition.

In one embodiment, the molded product may be a plastic member of an electronic device housing, which includes a glass frame and a plastic member adjoining at least one surface of the glass frame.

In another embodiment, the molded product may be a plastic member of an electronic device housing, which includes a polycarbonate resin frame and a plastic member adjoining at least one surface of the polycarbonate resin frame.

FIG. 1 is a schematic sectional view of an electronic device housing according to one embodiment of the present invention. It should be understood that the drawings are not to precise scale and the dimensions of components are exaggerated for clarity of description in the drawings. Referring to FIG. 1, the electronic device housing according to the embodiment includes a glass or polycarbonate resin frame 10; and at least one plastic member 20 adjoining at least one surface of the glass or polycarbonate resin frame 10, wherein the plastic member is formed of the polyamide resin composition.

In one embodiment, the glass or polycarbonate resin frame 10 and the plastic member 20 may have various shapes without being limited to the shapes shown in the drawings. The glass or polycarbonate resin frame 10 and the plastic member 20 form an adjoining structure in which the glass or polycarbonate resin frame 10 adjoins at least one surface of the plastic member 20. The adjoining structure may be realized by bonding or insertion, but is not limited thereto.

In one embodiment, the glass or polycarbonate resin frame 10 may be selected from among any commercially available products, which can be applied to typical electronic device housings.

In one embodiment, the plastic member 20 may be formed of the polyamide resin composition by various molding methods, such as injection molding, extrusion molding, vacuum molding, casting, and the like. Specifically, the plastic member 20 may be an interior member of an electronic device and the like.

Mode for Invention

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Polyamide Resin

Polyamide MXD10 (Manufacturer: Arkema Co., Ltd., Product Name: RILSAN XMFO, Inherent viscosity[η]: 0.75 dL/g) was used.

(B) Aliphatic Polyamide Resin

Polyamide 10,12 (Manufacturer: Evonik Co., Ltd., Product Name: VESTAMID TERRA DD) was used.

(C) Inorganic Fillers

Glass fiber (Manufacturer: Nittobo Co., Ltd., Product Name: 3PA-820) was used.

(D) Modified Polyalkylene Glycol (D1) Isocyanate modified polyethylene glycol (Manufacturer: Aldrich GmbH, Product Name: mPEG5K-isocyanate, Weight average molecular weight: 5,000 g/mol) was used.

(D2) Succinimide modified polyethylene glycol (Manufacturer: Aldrich GmbH, Product Name: Poly(ethylene glycol) N-hydroxysuccinimide, Weight average molecular weight: 5,000 g/mol) was used.

(D3) Epoxy modified polyethylene glycol (Manufacturer: Aldrich GmbH, Product Name: Poly(ethylene glycol) diglycidyl ether, Weight average molecular weight: 2,000 g/mol) was used.

(E) Polyalkylene Glycol

Polyethylene glycol (Manufacturer: Aldrich GmbH, Product Name: Poly(ethylene glycol) methyl ether, Weight average molecular weight: 2,000 g/mol) was used.

Examples 1 to 5 and Comparative Examples 1 to 7

The aforementioned components were mixed in amounts as listed in Tables 1 and 2 and placed in a twin-screw extruder (L/D: 40, Φ: 45 mm), followed by melting and extrusion at a barrel temperature of 300° C., thereby preparing a polyamide resin composition in pellet form. The prepared pellets were dried at a temperature of 100° C. for 6 to 8 hours and then subjected to injection molding using an injection molding machine under conditions of a cylinder temperature of 320° C. and a mold temperature of 80° C., thereby preparing a specimen. The specimen was evaluated as to the following properties. Results are shown in Tables 1 and 2.

Property Evaluation (1) Bonding strength (unit: N/cm), (shear stress, unit: kgf/cm$^2$): Bonding strength was measured on an injection-molded specimen having a size of 100 mm×25 mm×2 mm in accordance with ASTM D1002, in which the specimen was bonded to a glass specimen or a polycarbonate (PC) specimen having the same size as the specimen via a urethane-based bonding agent subjected to aging at 110° C. so as to have an overlapping area of 30 mm×25 mm therebetween and was heated at a bonded portion therebetween at 80° C. for 120 seconds, followed by aging at room temperature for 5 minutes.

(2) Brightness recovery rate (unit: %): Brightness recovery rate was calculated according to Equation 1.

$$\text{Brightness recovery rate (\%)} = L_1/L_0 \times 100, \qquad \text{Equation 1}$$

where $L_0$ denotes an initial L* value of an injection-molded specimen having a size of 50 mm×90 mm×2 mm, as measured using a colorimeter (MINOLTA, CM-3500d) and $L_1$ denotes an L* value of the injection-molded specimen, as measured using the colorimeter (MINOLTA, CM-3500d) after three lines (distance between adjacent lines: 3 mm) were drawn on a surface of the specimen under a load of 200 g using a black permanent pen (Manufacturer: Monami Co., Ltd., Product Name: Namepen F) and the specimen was left under conditions of 50° C. and 95% RH for 1 hour and then under conditions of 25° C. and at 50% RH for 1 hour, followed by cleaning the surface of the specimen 5 times with ethanol and a cloth.

(3) Notched Izod impact strength (unit: kgf·cm/cm): Notched Izod impact strength was measured on a 1/8" thick notched Izod specimen in accordance with ASTM D256.

(4) Flexural modulus (unit: kgf/cm$^2$): Flexural modulus was measured on a 6.4 mm thick specimen at a speed of 2.8 mm/min in accordance with ASTM D790.

(5) Releasability (injection moldability): Resistance (unit: N) generated from an ejector pin at the dead center of a circular specimen (diameter: 100 mm, thickness: 2 mm) upon injection molding was measured using a pressure sensor (Manufacturer: Kistler, Product Name: Type 9221A).

TABLE 1

| | Example | | | | |
|---|---|---|---|---|---|
| | 1 | 2 | 3 | 4 | 5 |
| (A) (wt %) | 10 | 15 | 20 | 15 | 15 |
| (B) (wt %) | 90 | 85 | 80 | 85 | 85 |
| (C) (parts by weight) | 54 | 54 | 54 | 54 | 54 |
| (D1) (parts by weight) | 3 | 3 | 3 | — | — |
| (D2) (parts by weight) | — | — | — | 3 | — |
| (D3) (parts by weight) | — | — | — | — | 3 |
| (E) (parts by weight) | — | — | — | — | — |
| Bonding strength Glass | 960 | 950 | 980 | 970 | 990 |
| Bonding strength PC | 1,000 | 990 | 980 | 1,000 | 990 |
| Brightness recovery rate | 95 | 95 | 96 | 95 | 96 |
| Notched Izod impact strength | 15 | 14 | 14 | 15 | 14 |
| Flexural modulus | 63,000 | 65,000 | 65,000 | 64,500 | 65,000 |
| Releasability (N) | 179 | 183 | 188 | 192 | 191 |

* parts by weight: parts by weight relative to 100 parts by weight of polyamide resin (A + B)

TABLE 2

| | Comparative Example | | | | | | |
|---|---|---|---|---|---|---|---|
| | 1 | 2 | 3 | 4 | 5 | 6 | 7 |
| (A) (wt %) | 1 | 45 | 15 | 15 | 15 | 15 | 15 |
| (B) (wt %) | 99 | 55 | 85 | 85 | 85 | 85 | 85 |
| (C) (parts by weight) | 54 | 54 | 25 | 75 | 54 | 54 | 54 |
| (D1) (parts by weight) | 3 | 3 | 3 | 3 | 0.1 | 6 | — |

TABLE 2-continued

|  | Comparative Example | | | | | | |
|---|---|---|---|---|---|---|---|
|  | 1 | 2 | 3 | 4 | 5 | 6 | 7 |
| (D2) (parts by weight) | — | — | — | — | — | — | — |
| (D3) (parts by weight) | — | — | — | — | — | — | — |
| (E) (parts by weight) | — | — | — | — | — | — | — |
| Bonding strength Glass | 520 | 420 | 920 | 550 | 440 | 940 | 350 |
| Bonding strength PC | 440 | 450 | 960 | 570 | 450 | 960 | 450 |
| Brightness recovery rate | 82 | 79 | 94 | 68 | 94 | 75 | 76 |
| Notched Izod impact strength | 12 | 15 | 9 | 20 | 14 | 14 | 15 |
| Flexural modulus | 42,000 | 66,000 | 35,000 | 110,000 | 64,000 | 65,000 | 64,000 |
| Releasability (N) | 169 | 215 | 156 | 236 | 190 | 211 | 214 |

* parts by weight: parts by weight relative to 100 parts by weight of polyamide resin (A + B)

From the above result, it could be seen that the polyamide resin compositions (Examples 1 to 5) according to the present invention exhibited good properties in terms of bonding strength to other materials (bonding strength to glass and PC), antifouling properties (brightness recovery rate), impact resistance (Notched Izod impact strength), stiffness (flexural modulus), injection moldability (releasability), and the like.

Conversely, it could be seen that the polyamide resin composition of Comparative Example 1 prepared using a small amount of the aromatic polyamide resin and an excess of the aliphatic polyamide resin suffered from deterioration in bonding strength to other materials, antifouling properties, and the like; the polyamide resin composition of Comparative Example 2 prepared using an excess of the aromatic polyamide resin and a small amount of the aliphatic polyamide resin suffered from deterioration in bonding strength to other materials, brightness recovery rate, injection moldability, and the like; the polyamide resin composition of Comparative Example 3 prepared using a small amount of the inorganic fillers suffered from deterioration in impact resistance, stiffness, and the like; and the polyamide resin composition of Comparative Example 4 prepared using an excess of the inorganic fillers suffered from deterioration in bonding strength to other materials antifouling properties, injection moldability, and the like. It could be seen that the polyamide resin composition of Comparative Example 5 prepared using a small amount of the modified polyalkylene glycol according to the present invention suffered from deterioration in bonding strength to other materials and the like; the polyamide resin composition of Comparative Example 6 prepared using an excess of the modified polyalkylene glycol suffered from deterioration in antifouling properties, injection moldability, and the like; and the polyamide resin composition of Comparative Example 7 prepared using polyethylene glycol (E) instead of the modified polyalkylene glycol suffered from deterioration in bonding strength to other materials antifouling properties, injection moldability, and the like.

It should be understood that various modifications, changes, alterations, and equivalent embodiments can be made by those skilled in the art without departing from the spirit and scope of the invention.

The invention claimed is:

1. A polyamide resin composition comprising:
   about 100 parts by weight of a polyamide resin comprising about 5 wt % to about 40 wt % of an aromatic polyamide resin and about 60 wt % to about 95 wt % of an aliphatic polyamide resin;
   about 30 to about 70 parts by weight of inorganic fillers; and
   about 0.5 to about 5 parts by weight of a modified polyalkylene glycol, the modified polyalkylene glycol comprising an isocyanate group, a succinimide group or an epoxy group at at least one terminal of polyalkylene glycol,
   wherein a weight ratio of the aromatic polyamide resin to the aliphatic polyamide resin is in the range of about 1:2 to about 1:15, and
   wherein a weight ratio of the polyamide resin to the modified polyalkylene glycol is in the range of about 30:1 to about 40:1.

2. The polyamide resin composition according to claim 1, wherein the aromatic polyamide resin comprises a polymer of an aromatic dicarboxylic acid and an aliphatic diamine and/or a polymer of an aliphatic dicarboxylic acid and an aromatic diamine.

3. The polyamide resin composition according to claim 1, wherein the aromatic polyamide resin is a polymer of an aliphatic dicarboxylic acid and an aromatic diamine.

4. The polyamide resin composition according to claim 1, wherein the aliphatic polyamide resin comprises polyamide 6, polyamide 11, polyamide 12, polyamide 4,6, polyamide 6,6, polyamide 6,10, polyamide 6,12, polyamide 10,10, and/or polyamide 10,12.

5. The polyamide resin composition according to claim 1, wherein the inorganic fillers comprise glass fibers, talc, wollastonite, whisker, silica, mica, and/or basalt fibers.

6. The polyamide resin composition according to claim 1, wherein the modified polyalkylene glycol has a weight average molecular weight of about 500 g/mol to about 10,000 g/mol, as measured by gel permeation chromatography (GPC).

7. The polyamide resin composition according to claim 1, wherein the polyamide resin composition has a bonding strength (shear stress) of about 800 kgf/cm$^2$ to about 1,100 kgf/cm$^2$, as measured on an injection-molded specimen having a size of 100 mm×25 mm×2 mm in accordance with ASTM D1002, in which the specimen is bonded to a glass specimen having the same size as the specimen via a urethane-based bonding agent subjected to aging at 110° C. so as to have an overlapping area of 30 mm×25 mm therebetween and is heated at a bonded portion therebetween at 80° C. for 120 seconds, followed by aging at room temperature for 5 minutes.

8. The polyamide resin composition according to claim 1, wherein the polyamide resin composition has a bonding strength (shear stress) of about 800 kgf/cm$^2$ to about 1,300 kgf/cm$^2$, as measured on an injection-molded specimen having a size of 100 mm×25 mm×2 mm in accordance with ASTM D1002, in which the specimen is bonded to a polycarbonate specimen having the same size as the specimen via a urethane-based bonding agent subjected to aging at 110° C. so as to have an overlapping area of 30 mm×25 mm therebetween and is heated at a bonded portion therebetween at 80° C. for 120 seconds, followed by aging at room temperature for 5 minutes.

9. The polyamide resin composition according to claim 1, wherein the polyamide resin composition has a brightness recovery rate of 90% or more, as calculated according to Equation 1:

$$\text{Brightness recovery rate (\%)} = L_1/L_0 \times 100,$$

where $L_0$ denotes an initial L" value of an injection-molded specimen having a size of 50 mm×90 mm×2 mm, as measured using a colorimeter, and $L_1$ denotes an L* value of the injection-molded specimen, as measured using the colorimeter after three lines (distance between adjacent lines: 3 mm) are drawn on a surface of the specimen under a load of 200 g using a black permanent pen (Manufacturer: Monami Co, Ltd., Product Name: Namepen F) and the specimen is left under conditions of 50° C. and at 95% RH for 1 hour and then under conditions of 25° C. and at 50% RH for 1 hour, followed by cleaning a surface of the specimen 5 times with ethanol and a cloth.

10. The polyamide resin composition according to claim 1, wherein the polyamide resin composition has a flexural modulus of about 40,000 kgf/cm² to about 70,000 kgf/cm², as measured on a 6.4 mm thick specimen at a speed of 2.8 mm/min in accordance with ASTM D790, a notched Izod impact strength of about 10 kgf·cm/cm to about 30 kgf·cm/cm, as measured on a ⅛" thick specimen in accordance with ASTM D256, and a resistance of about 150 N to about 200 N generated from an ejector pin at the dead center of a circular specimen (diameter: 100 mm, thickness: 2 mm) upon injection molding.

11. A molded product formed of the polyamide resin composition according to claim 1.

12. The molded product according to claim 11, wherein the molded product is a plastic member of an electronic device housing comprising: a glass frame and the plastic member adjoining at least one surface of the glass frame.

13. The molded product according to claim 11, wherein the molded product is a plastic member of an electronic device housing comprising: a polycarbonate resin frame and the plastic member adjoining at least one surface of the polycarbonate resin frame.

14. The polyamide resin composition according to claim 1, wherein the modified polyalkylene glycol comprises an isocyanate group at at least one terminal of the polyalkylene glycol.

15. The polyamide resin composition according to claim 1, wherein the modified polyalkylene glycol comprises a succinimide group at at least one terminal of the polyalkylene glycol.

16. The polyamide resin composition according to claim 1, wherein the modified polyalkylene glycol comprises an epoxy group at at least one terminal of the polyalkylene glycol.

17. The polyamide resin composition according to claim 1, wherein the polyamide resin composition has:
- a bonding strength (shear stress) of about 800 kgf/cm² to about 1,100 kgf/cm², as measured on an injection-molded specimen having a size of 100 mm×25 mm×2 mm in accordance with ASTM D1002, in which the specimen is bonded to a glass specimen having the same size as the specimen via a urethane-based bonding agent subjected to aging at 110° C. so as to have an overlapping area of 30 mm×25 mm therebetween and is heated at a bonded portion therebetween at 80° C. for 120 seconds, followed by aging at room temperature for 5 minutes;
- a bonding strength (shear stress) of about 800 kgf/cm² to about 1,300 kgf/cm², as measured on an injection-molded specimen having a size of 100 mm×25 mm×2 mm in accordance with ASTM D1002, in which the specimen is bonded to a polycarbonate specimen having the same size as the specimen via a urethane-based bonding agent subjected to aging at 110° C. so as to have an overlapping area of 30 mm×25 mm therebetween and is heated at a bonded portion therebetween at 80° C. for 120 seconds, followed by aging at room temperature for 5 minutes; and
- a brightness recovery rate of 90% or more, as calculated according to Equation 1:

$$\text{Brightness recovery rate (\%)} = L_1/L_0 \times 100,$$

where $L_0$ denotes an initial L' value of an injection-molded specimen having a size of 50 mm×90 mm×2 mm, as measured using a colorimeter, and $L_1$ denotes an L" value of the injection-molded specimen, as measured using the colorimeter after three lines (distance between adjacent lines: 3 mm) are drawn on a surface of the specimen under a load of 200 g using a black permanent pen (Manufacturer: Monami Co, Ltd., Product Name: Namepen F) and the specimen is left under conditions of 50° C. and at 95% RH for 1 hour and then under conditions of 25° C. and at 50% RH for 1 hour, followed by cleaning a surface of the specimen 5 times with ethanol and a cloth.

18. The polyamide resin composition according to claim 17, wherein the modified polyalkylene glycol comprises an isocyanate group at at least one terminal of the polyalkylene glycol.

19. The polyamide resin composition according to claim 17, wherein the modified polyalkylene glycol comprises a succinimide group at at least one terminal of the polyalkylene glycol.

20. The polyamide resin composition according to claim 17, wherein the modified polyalkylene glycol comprises an epoxy group at at least one terminal of the polyalkylene glycol.

\* \* \* \* \*